US012610998B2

(12) United States Patent
Samatar et al.

(10) Patent No.: US 12,610,998 B2
(45) Date of Patent: Apr. 28, 2026

(54) DISPOSABLE GARMENTS

(71) Applicant: Mawadda LLC, St. Paul, MN (US)

(72) Inventors: Yasmin Elmi Samatar, Apple Valley, MN (US); Firaoli A. Adam, Woodbury, MN (US)

(73) Assignee: Mawadda LLC, St. Paul, MN (US)

( * ) Notice: Subject to any disclaimer, the term of this patent is extended or adjusted under 35 U.S.C. 154(b) by 0 days.

(21) Appl. No.: 18/074,406

(22) Filed: Dec. 2, 2022

(65) Prior Publication Data

US 2023/0172298 A1 Jun. 8, 2023

Related U.S. Application Data

(60) Provisional application No. 63/285,922, filed on Dec. 3, 2021.

(51) Int. Cl.
*A42B 1/012* (2021.01)
*A42B 1/019* (2021.01)
*A62B 17/04* (2006.01)

(52) U.S. Cl.
CPC .............. *A42B 1/012* (2021.01); *A42B 1/019* (2021.01); *A62B 17/04* (2013.01)

(58) Field of Classification Search
CPC ........... A42B 1/012; A42B 1/019; A42B 1/04; A42B 1/22; A42B 1/00; A41D 13/1209; A41D 13/129; A41D 13/1153
See application file for complete search history.

(56) References Cited

U.S. PATENT DOCUMENTS 110,242 A * 12/1870 Keating .................. A41D 1/18 2/84
1,184,032 A * 5/1916 Schrom ................. A42B 1/012 D2/870
1,263,958 A * 4/1918 Strachan ................. A42B 5/00 D2/502
1,316,778 A * 9/1919 Ensten .................. A42B 1/045 2/172
1,399,523 A * 12/1921 Sable ..................... A41D 23/00 2/203
1,485,392 A * 3/1924 Halek ...................... A41D 3/02 2/205
1,720,560 A * 7/1929 Lipper .................. A42B 1/041 2/195.8
1,897,100 A * 2/1933 Ione ....................... A42B 1/045 132/274
(Continued)

FOREIGN PATENT DOCUMENTS

GB 2604108 A * 8/2022 ............... A45D 8/40
WO WO-2012137357 A1 * 10/2012 ............. A42B 1/012

OTHER PUBLICATIONS https://www.indiamart.com/proddetail/non-woven-hood-for-head-neck-shoulder-22464889062.html?srsltid=AfmBOoraEaMm54-Slwkm8rGhtH2kUBr9HyWzeJOCr5vPZ3u32eGlzgqs (Year: 2020).*
(Continued)

*Primary Examiner* — Heather Mangine
*Assistant Examiner* — Raquel M. Weis
(74) *Attorney, Agent, or Firm* — Fredrikson & Byron, P.A.

(57) ABSTRACT

A disposable protective garment is disclosed that includes a hijab with a head cover portion and a neck cover portion extending from the head cover portion. The head cover portion and the neck cover portion are made of a barrier material.

17 Claims, 5 Drawing Sheets

(56) References Cited

U.S. PATENT DOCUMENTS 1,994,212 A * 3/1935 Davis .................... A42B 1/046 2/205
2,039,478 A * 5/1936 Ensten .................. A42B 1/045 2/205
2,130,933 A * 9/1938 Sweet .................. A41D 23/00 2/203
2,374,643 A * 5/1945 Boettcher ............. A42B 1/046 2/DIG. 1
2,413,319 A * 12/1946 Golfieri ................. A42B 1/045 2/171.01
2,420,378 A * 5/1947 Lehman ................ A42B 1/045 2/195.8
2,464,007 A * 3/1949 Towle .................. A41D 23/00 2/207
2,529,106 A * 11/1950 Schauweker .......... A62B 17/04 128/201.25
2,665,427 A * 1/1954 Street .................... A42B 1/041 2/195.7
2,741,773 A * 4/1956 Wolfe .................. A41D 23/00 D2/502
3,169,252 A * 2/1965 Goldstein ............. A42B 1/046 2/203
3,314,079 A * 4/1967 Stout .................... A42B 1/041 2/173
3,531,952 A * 10/1970 Chesebro, Jr. ......... A42B 1/046 2/202
3,740,767 A * 6/1973 Schuessler ............ A42B 1/046 2/202
3,781,916 A * 1/1974 Vitol .................... A41D 13/00 2/202
3,885,558 A * 5/1975 Belkin ............... A41D 13/1153 2/173
3,935,597 A * 2/1976 Frechmann ........... A41D 23/00 2/207
3,943,575 A * 3/1976 Bolker .................. A42B 1/046 2/205
3,955,570 A * 5/1976 Hutter, III ............. A61B 90/40 128/863
3,968,521 A * 7/1976 Bashlow ................ A42B 1/046 2/203
4,041,203 A * 8/1977 Brock ...................... B32B 5/08 206/439
4,196,245 A * 4/1980 Kitson ................. D04H 1/4374 442/345
4,572,173 A * 2/1986 Comeau ................. A61B 46/00 2/202
4,589,408 A * 5/1986 Singer ................ A41D 13/1153 2/205
4,805,639 A * 2/1989 Dial ......................... A61F 9/02 2/9
5,025,507 A * 6/1991 Kirby ................. A41D 13/1153 2/202
5,097,534 A * 3/1992 Viemeister ............. A41D 27/10 2/84
5,142,704 A * 9/1992 Viemeister ......... A41D 13/1218 2/202
5,269,024 A * 12/1993 Wyatt .................... A42B 1/046 2/200.1
5,369,809 A * 12/1994 Hall ........................ A41D 3/00 2/202
5,383,236 A * 1/1995 Sesselmann ............. A45F 3/04 2/243.1
5,492,753 A * 2/1996 Levy .................. A41D 13/1209 442/328
5,704,068 A * 1/1998 Martin .................. A42B 1/046 2/202
5,765,230 A * 6/1998 Sivret .................... A42B 1/046 2/202
5,822,800 A * 10/1998 Anderson ................ A42B 1/06 2/202
5,839,432 A * 11/1998 Daneshvar ............... A42C 5/04 2/205
5,845,340 A * 12/1998 Frislie .................... A42B 1/046 2/202
5,867,825 A * 2/1999 Scheerer ............ A41D 13/1218 206/278
5,887,279 A * 3/1999 Elting ................ A41D 13/1263 2/912
6,065,156 A * 5/2000 Murphy ................. A41D 23/00 2/207
6,286,144 B1 * 9/2001 Henderson ........... A62B 17/006 2/457
6,442,763 B1 * 9/2002 Larson .................. A42B 1/046 2/202
6,789,266 B1 * 9/2004 Mills ...................... A42B 1/045 2/202
6,948,190 B2 * 9/2005 McGreggor ........... A42B 1/049 2/202
7,117,544 B2 * 10/2006 Kanitz .................. A41D 23/00 2/172
7,231,670 B2 * 6/2007 Chang .................... A42B 1/045 2/207
7,958,889 B1 * 6/2011 Fernandez-DeCastro .................. A41D 13/11 128/205.27
8,225,428 B2 * 7/2012 Grilliot .................. A62B 17/04 2/202
8,516,619 B2 * 8/2013 Absi ...................... A42B 1/041 2/202
D735,846 S * 8/2015 McCoy ..................... D24/110.6
9,138,025 B1 * 9/2015 Lunsford ............... A42B 1/041
D764,050 S * 8/2016 McCoy ..................... D24/110.6
10,292,441 B2 * 5/2019 Graves ................... A41D 23/00
10,912,373 B2 * 2/2021 Graves ................... A41D 27/08
11,388,937 B2 * 7/2022 Nachawati ............... A41D 1/22
2003/0037362 A1 * 2/2003 Dodge ..................... A41D 3/08 2/89
2004/0123367 A1 * 7/2004 Schorr ................... A61B 42/00 2/69
2006/0130213 A1 * 6/2006 Mickle ................... A42B 1/046 2/202
2006/0143796 A1 * 7/2006 Bugarin ................. A41D 23/00 2/202
2008/0196144 A1 * 8/2008 Ruiz .................. A41D 13/1236 2/171
2009/0000011 A1 * 1/2009 Halley ..................... A42B 5/00 132/273
2009/0019622 A1 * 1/2009 Mayfield ................ A41D 13/02 2/455
2009/0055989 A1 * 3/2009 Chih ...................... A41D 31/12 2/84
2009/0151048 A1 * 6/2009 Laury .................... A45D 44/00 132/273
2010/0064418 A1 * 3/2010 Graham ................. A42B 1/041 132/273
2011/0185482 A1 * 8/2011 Godfrey ............. A41D 13/1161 2/455
2011/0209266 A1 * 9/2011 Perry ..................... A41D 23/00 2/207
2011/0225699 A1 * 9/2011 Elhamsadat ........... A42B 1/048 2/84
2012/0023639 A1 * 2/2012 Rojas Mas ............. A42B 1/048 2/84
2012/0030858 A1 * 2/2012 Duffin ...................... A42B 1/04 2/183
2012/0066812 A1 * 3/2012 Alzate .................... A41D 27/20 2/202
2012/0291181 A1 * 11/2012 Absi ...................... A42B 1/041 2/207
2013/0247275 A1 * 9/2013 Javad ....................... A42B 1/16 2/203
2013/0326792 A1 * 12/2013 Matos .................... A41D 23/00 2/207
2014/0109287 A1 * 4/2014 Ramirez .................. A42B 1/04 2/84
2014/0304888 A1 * 10/2014 Tsai ................... A41D 13/1153 2/173

(56) References Cited

U.S. PATENT DOCUMENTS

| | | | | |
|---|---|---|---|---|
| 2015/0201687 | A1* | 7/2015 | Graves | A41D 23/00 2/207 |
| 2016/0058096 | A1* | 3/2016 | Simmons | A45D 8/36 2/207 |
| 2016/0095359 | A1* | 4/2016 | Fox | A62B 17/04 2/84 |
| 2016/0199674 | A1* | 7/2016 | Johnson | G01K 13/20 2/457 |
| 2016/0374415 | A1* | 12/2016 | Chang | A41D 15/00 2/69 |
| 2017/0027262 | A1* | 2/2017 | Palmer | A42B 1/22 |
| 2019/0037944 | A1* | 2/2019 | Tussey | A42B 1/049 |
| 2019/0045864 | A1* | 2/2019 | Teat | A42B 1/225 |
| 2019/0090561 | A1* | 3/2019 | Brandt | A42B 1/046 |
| 2019/0350290 | A1* | 11/2019 | Blake | A42B 1/046 |
| 2020/0054088 | A1* | 2/2020 | Lin | D06M 13/292 |
| 2020/0060375 | A1* | 2/2020 | Jascomb | A62B 18/003 |
| 2020/0069980 | A1* | 3/2020 | Sonntag | A41D 31/085 |
| 2020/0146366 | A1* | 5/2020 | Nachawati | A63B 71/10 |
| 2020/0205492 | A1* | 7/2020 | Chua | A41D 13/1209 |
| 2021/0093024 | A1* | 4/2021 | Christensen | A41D 13/1218 |
| 2021/0106113 | A1* | 4/2021 | Lee | A42B 1/012 |
| 2021/0204621 | A1* | 7/2021 | Jefferis | A41D 13/1209 |
| 2021/0330998 | A1* | 10/2021 | Lin | A41D 13/1115 |
| 2021/0339269 | A1* | 11/2021 | Kuntz | A62B 7/10 |
| 2021/0361012 | A1* | 11/2021 | Schirmer | A42B 1/008 |
| 2022/0361602 | A1* | 11/2022 | Rosati | A41D 13/1153 |
| 2023/0172298 | A1* | 6/2023 | Samatar | A42B 1/012 2/202 |

OTHER PUBLICATIONS https://www.youtube.com/watch?v=S-169XD_RIY (Year: 2009).* https://www.kcprofessional.com/en-us/products/safety-and-personal-protection-equipment/disposable-apparel/dry-particulate-protection/breathable-particle-protection/kleenguard-a20-hood/36890 (Year: 2020).* https://www.amazon.com/EZGOODZ-Protective-Non-Sterile-Disposable-Microporous/dp/B095GWT8MW?th=1 (Year: 2021).* https://www.medelita.com/blog/medical-hijab-womens-day.html?srsltid=AfmBOoo6f2sOE4uoUcYzpJELxWLaWRYhAy5pHd34zYhcGqZZieEvLbim (Year: 2019).* https://www.chinadismac.com/disposable-surgeon-hood-with-tie-on/ (Year: 2019).* https://mms.mckesson.com/product/167145/Aspen-Surgical-Products-5246 (Year: 2019).* https://www.alibaba.com/product-detail/2022-New-Design-Instant-Hijab-Medical_1600434481551.html (Year: 2020).*

Royal Derby Hospital: Disposable Sterile Hijabs Introduced, *BBC*, Dec. 17, 2019 (3 pages).

* cited by examiner

DISPOSABLE GARMENTS

PRIORITY APPLICATION

This application claims the benefit of U.S. Provisional Application Serial No. 63/285,922 filed Dec. 3, 2021, which is incorporated by reference herein in its entirety.

FIELD

The present disclosure relates to disposable garments. The present disclosure further relates to disposable hijabs and hijab covers.

SUMMARY

According to an embodiment, a disposable protective garment includes a hijab. The hijab includes a head cover portion and a neck cover portion extending from the head cover portion. The head cover portion and the neck cover portion include barrier material. The hijab has a face opening. The face opening may be at least partially circumscribed by an elastic band.

The hijab may be a single use hijab. The hijab may be a surgical hijab. The hijab may be a hijab cover.

The hijab may be made of material that is opaque. The head cover portion may cover a user's hair and ears. The head cover portion does not substantially cover a user's face.

The neck cover portion may include a frustoconical shape. The neck cover portion may include a first elongated portion and an opposing second elongated portion, forming a scarf.

The barrier material may include a spunbond layer. The barrier material may include a meltblown layer. The barrier material may include a plurality of layers. The barrier material may include a filter layer. The barrier material may exhibit water resistance.

The disposable protective garment may further include a gown connected to the hijab.

DEFINITIONS

Figure 1A:
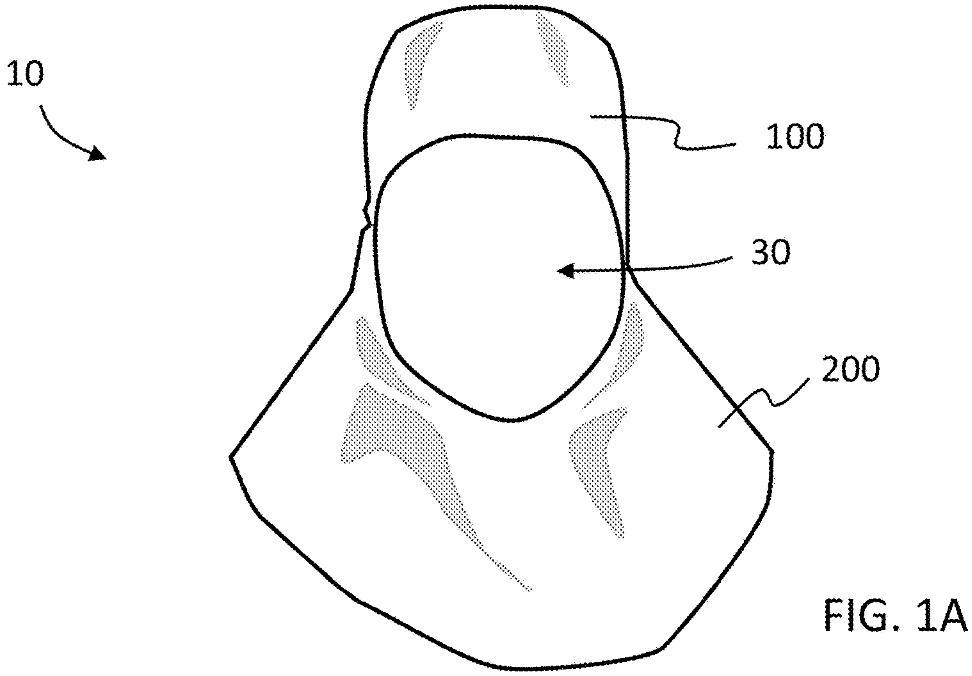
FIG. 1A is a front view of a hijab as worn by a user according to an embodiment.
Figure 1B:
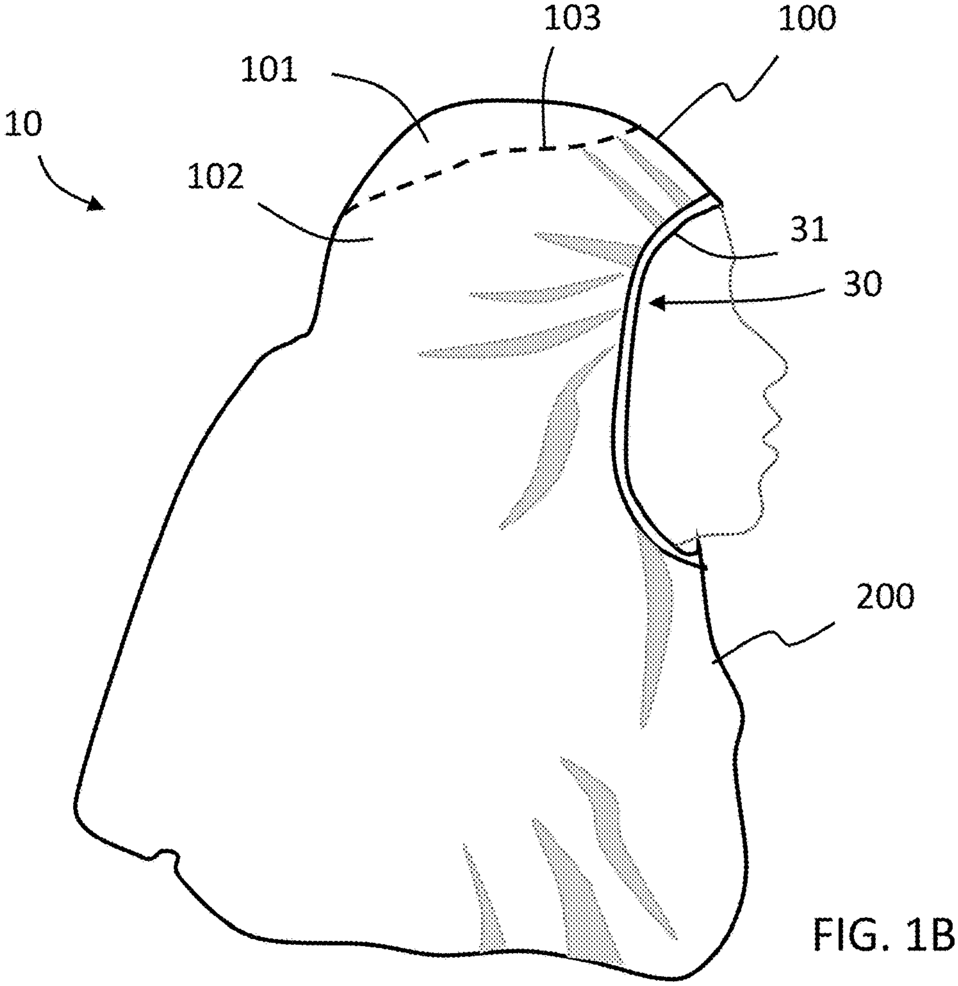
FIG. 1B is a side view of the hijab of FIG. 1A as worn by a user.
Figure 1C:
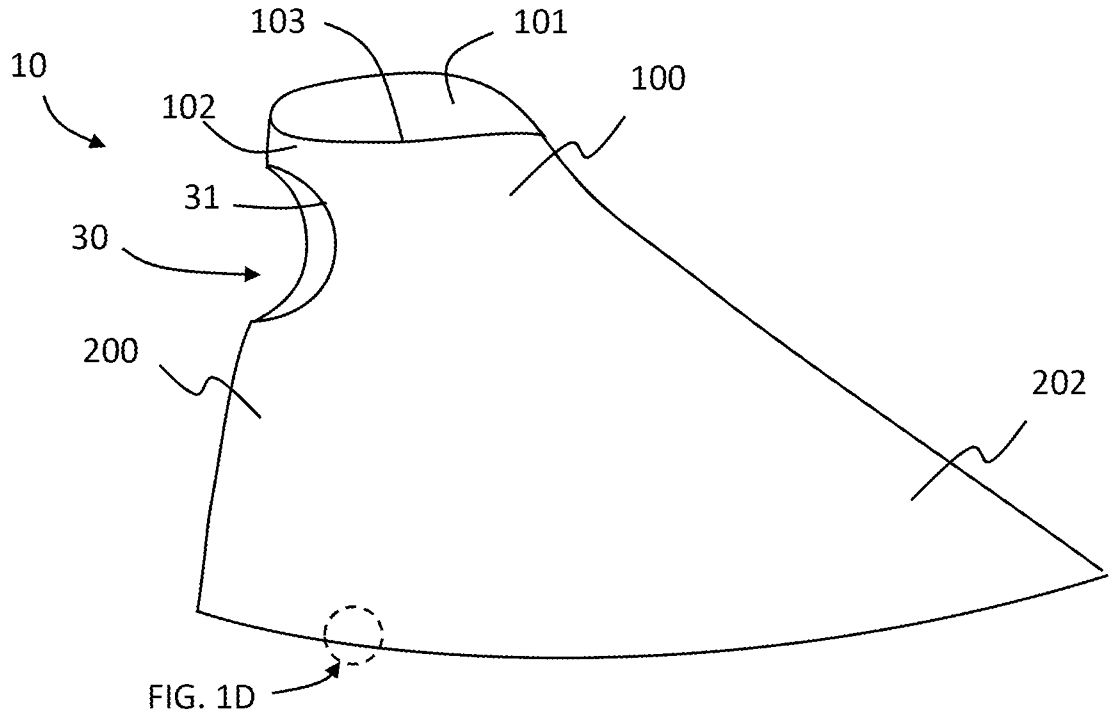
FIG. 1C is side view of the hijab of FIG. 1A.
Figure 1D:
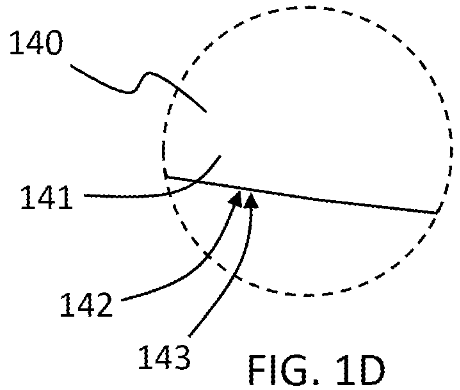
FIG. 1D is a partial close-up view of the material of the hijab of FIG. 1A.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, the terms "polymer" and "polymeric material" include, but are not limited to, organic homopolymers, copolymers, such as for example, block, graft, random and alternating copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries.

The term "opaque" is used in this disclosure to describe materials that do not allow visible light to pass through. In the context of the protective garments of the present disclosure, an opaque material is a material that when worn on the body, parts of the body or a user's hair covered by the material cannot be seen through the material. An opaque material may be colorless or colored.

The term "substantially" as used here has the same meaning as "significantly," and can be understood to modify the term that follows by at least about 90%, at least about 95%, or at least about 98%. The term "substantially free" of a particular compound means that the compositions of the present invention contain less than 1,000 parts per million (ppm) of the recited compound.

The term "not substantially" as used here has the same meaning as "not significantly," and can be understood to have the inverse meaning of "substantially," i.e., modifying the term that follows by not more than 25%, not more than 10%, not more than 5%, or not more than 2%.

The term "about" is used here in conjunction with numeric values to include normal variations in measurements as expected by persons skilled in the art, and is understood to have the same meaning as "approximately" and to cover a typical margin of error, such as ±5% of the stated value.

Terms such as "a," "an," and "the" are not intended to refer to only a singular entity, but include the general class of which a specific example may be used for illustration.

The terms "a," "an," and "the" are used interchangeably with the term "at least one." The phrases "at least one of" and "comprises at least one of" followed by a list refers to any one of the items in the list and any combination of two or more items in the list.

As used here, the term "or" is generally employed in its usual sense including "and/or" unless the content clearly dictates otherwise. The term "and/or" means one or all of the listed elements or a combination of any two or more of the listed elements.

The recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" or "at least" a particular value, that value is included within the range.

As used here, "have," "having," "include," "including," "comprise," "comprising," or the like are used in their open-ended sense, and generally mean "including, but not limited to." It will be understood that "consisting essentially of," "consisting of," and the like are subsumed in "comprising" and the like. As used herein, "consisting essentially of," as it relates to a composition, product, method, or the like, means that the components of the composition, product, method, or the like are limited to the enumerated components and any other components that do not materially affect the basic and novel characteristic(s) of the composition, product, method, or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Any direction referred to here, such as “top,” “bottom,” “left,” “right,” “upper,” “lower,” and other directions and orientations are described herein for clarity in reference to the figures and are not to be limiting of an actual device or system or use of the device or system. Devices or systems as described herein may be used in a number of directions and orientations.

DETAILED DESCRIPTION

The present disclosure relates to disposable garments. The present disclosure further relates to disposable hijabs and hijab covers.

There is a long felt need in the industry to provide disposable garments to meet users' needs. These garments are in high demand, especially during the pandemic. In particular, there is a need for disposable head wear for users who would like to cover their hair or neck or both due to personal or religious reasons. One of the garments users may use to cover their hair and neck is a hijab. However, currently there are no disposable hijabs available for users to meet both working requirements and personal or religious needs. For example, there is a lack of disposable hijabs in hospitals and healthcare settings. Specifically, there are no disposable hijabs available for users such as healthcare workers and patients. Alternative garments, such as hair nets or bed sheets, are sometimes provided to users to cover the hair for procedures and to meet relevant protocol requirements. The lack of appropriate disposable head wear compromises the safety of users, for example, in the operating room. A regular hijab for daily use typically does not meet sanitation protocols and as a result, impeded users' safety.

There is a need for disposable protective garments that enable compliance with working requirements as well as in able to meet a user's personal or religious needs for covering the hair, neck, chest, or a combination thereof. Specifically, there is a need for disposable hijabs or head scarves that provide healthcare workers with viable personal protective equipment (PPE). Preferably, such disposable hijabs or head scarves meet cultural needs and hijab standards for modesty, as well as provide comfort and aesthetic satisfaction. For example, such disposable hijabs or head scarves are designed to either be worn with or without other head wear, such as with or without a regular hijab for daily wear. The disposable hijabs and head scarves of the present disclosure address a wide range of use cases present in healthcare environments. Reference to a hijab in this disclosure is intended to cover hijabs and head scarves.

According to an embodiment, a disposable protective garment may include a hijab. A hijab is term used to refer to a head covering, typically worn for modesty. A hijab is worn on the head and typically covers at least a majority of the hair, as well as the neck of the user. A hijab may also cover at least a portion of the chest of the user. A hijab may be worn in various ways. For example, a hijab may be a slip-on garment or may be used by wrapping the material around the head, neck, or upper body, or may be worn like a turban.

According to an embodiment, the hijab includes a face opening. The face opening may be designed to have a snug fit. The face opening may at least partially be circumscribed by a seam. The seam may include a mechanism for gathering the fabric around the face to provide a snug fit. The seam may include an elastic band.

The hijab is intended to cover a user's head and neck. To provide the desired modesty, the material of the hijab may not be see-through. According to some embodiments, the hijab is made of material that is opaque. In some cases, the material may be transparent if observed in a single layer but when worn as intended, potentially layering the material, the hijab provides the desired coverage (e.g., is not transparent). The disposable hijab may be worn together with another hijab that provides the desired coverage (e.g., is not transparent). In such cases, the disposable hijab does not necessarily need to be opaque.

According to an embodiment, the hijab of the present disclosure is disposable. That is, the hijab is not intended for long-term wear and multiple washes. According to an embodiment, the hijab may be a single-use hijab. A single-use hijab is intended to be disposed of after one-time use or multiple uses until contamination. According to an embodiment, the hijab may be a surgical garment. The surgical hijab is intended to ensure compliance with surgical requirements (e.g, use in an operating room). The hijab may be sterilizable. The hijab may be provided as a sterile surgical garment. According to an embodiment, the hijab meets or exceeds sanitation protocol needs. According to an embodiment, the hijab may be part of a work uniform.

According to an embodiment, the hijab may be a hijab cover. That is, the hijab may be used as a cover on the top of a regular daily use hijab. The regular daily use hijab may be any type of hijab.

According to an embodiment, the hijab includes a head cover portion. The head cover portion is intended to cover at least a majority of a user's hair. The head cover portion may cover all of the user's hair. The head cover portion may cover the ears. According to an embodiment, the head cover portion is not intended to substantially cover a user's face. The head cover may include a face covering like face mask. The head cover portion may include a face opening. The face opening is designed to have a snug fit.

According to an embodiment, the hijab includes a neck cover portion connected to the head cover portion. The neck cover portion is intended to cover at least a majority of a user's neck. The neck cover portion may cover all of the user's neck. According to an embodiment, the neck cover portion may have a frustoconical or a tubular shape. According to an embodiment, the neck cover portion may include one or more scarf-like extensions. According to an embodiment, the neck cover portion may include a first elongated portion and an opposing second elongated portion. The first and second elongated portions extend from the head cover portion. The first and second elongated portions of the neck cover portion together form a scarf shape to cover the user's neck.

According to an embodiment, there are multiple ways to wear the hijab. In some embodiments, the hijab may be worn in a slip-on way. That is, a user may slip the hijab over the user's head. In some embodiments, the hijab may be worn in a wrap way. That is, a user may wrap the hijab around the head, neck, and optionally upper body.

According to an embodiment, a disposable protective garment may include a hijab and a gown. The gown may be connected to the hijab via a connecting portion. The gown may be removably connected to the hijab via a connecting portion. The connecting portion include material (fabric). The connecting portion may include a connection mechanism. The connection mechanism may be a seam or may include a zipper, buttons, snaps, magnets, hook-and-loop, ties, or the like, or a combination thereof. According to an embodiment, the hijab includes a head cover portion and a neck cover portion. According to an embodiment, the neck cover portion extends from the head cover portion. According to an embodiment, the gown extends from the neck cover portion.

According to an embodiment, the disposable protective garment may be made of any suitable material. Suitable materials may include woven and non-woven fabrics. Exemplary materials that may be used to prepare the disposable protective garment or its parts include synthetic materials such as polypropylene, polyester, polyamide, polyacrylic, and polylactic acid; semi-synthetic materials such as rayon, modal, lyocell, and viscose; and natural materials such as cotton, hemp, linen, bamboo, wool, and silk; and combinations thereof. In some embodiments, the disposable protective garment is made of a non-woven material.

In some embodiments, the disposable protective garment or a part of the disposable protective garment is made of a material including a plurality of layers. In some embodiments, the plurality of layers may be two layers. In some embodiments, the plurality of layers may be three layers. In some embodiments, the plurality of layers may be four layers. In some embodiments, the plurality of layers may be five layers. In some embodiments, the plurality of layers may be a three layer in a spunbond-meltblown-spunbond structure. The layers may be made of the same or different materials. The layers may have different properties. For example, the layers may have the same or different chemical composition, barrier properties, transparency, water repellency, dirt repellency, porosity, thickness, etc.

According to an embodiment, any one or more portions of the disposable protective garment may include a barrier material. The barrier material may independently select from synthetic material such as but not limited to polypropylene, polyester, polyamide, polyacrylic, polylactic acid; semi-synthetic material such as but not limited to rayon, modal, lyocell, viscose; natural material such as but not limited to cotton, hemp, linen, bamboo, wool, silk; and combinations thereof. According to an embodiment, the barrier material forms at least one of the layers of a material having a plurality of layers. According to an embodiment, the barrier material may include a plurality of layers. According to an embodiment, the barrier material may include a spunbond layer. The spunbond layer may form an outer layer of the disposable protective garment. According to an embodiment, the barrier material may include a meltblown layer. According to an embodiment, the barrier material may include a filter layer. The filter layer may be an inner layer sandwiched between outer layers. The filter layer may include a meltblown layer. According to an embodiment, the barrier material may exhibit a water resistant property. Water resistance may be measured by a standardized test, such as AATCC 42 or AATCC 127. According to an embodiment, the water resistance property of the barrier material is achieved by using a water resistance treatment. The water resistance treatment may include a spray treatment. According to an embodiment, the barrier material may breathable. Breathability may be understood as the ability of water vapor to permeate through the material.

Any suitable thickness of material may be used to construct the protective garment. According to an embodiment, the head cover portion, neck cover portion, and/or gown are made of material having a basis weight 10 gsm (grams per square meter) or greater, 15 gsm or greater, or 20 gsm or greater. The material may have a basis weight of 100 gsm or less, 75 gsm or less, 50 gsm or less, 40 gsm or less, or 30 gsm or less. In some embodiments, the material has a basis weight of about 10 gsm to 100 gsm, 15 gsm to 50 gsm, or about 25 gsm.

In some embodiments, the water resistance property of the barrier material qualifies as one of four levels of U.S. Food and Drug Administration (FDA) barrier performance for non-surgical medical/isolation gowns. FDA barrier performance in non-surgical medical/isolation gowns in the present disclosure refers to American National Standards Institute ANSI/AAMI PB70:2012: Liquid Barrier Performance. One of the tests in the FDA barrier performance in non-surgical medical/isolation gowns is American Association of Textile Chemists and Colorists (AATCC) test AATCC 42 for Water Resistance: Impact Penetration Test. In some embodiments, the water resistance property of the barrier material qualifies as level 1 based on AATCC 42 Water Resistance-Impact Penetration test (equal to or less than 4.5 grams). In some embodiments, the water resistance property of the barrier material qualifies as level 2 based on AATCC 42 Water Resistance-Impact Penetration test (equal to or less than 1.0 grams), and AATCC 127 Water Resistance-Hydrostatic Pressure test (equal to or greater than 20 cm). In some embodiments, the water resistance property of the barrier material qualifies as level 3 based on AATCC 42 Water Resistance-Impact Penetration test (equal to or less than 1.0 grams), and AATCC 127 Water Resistance-Hydrostatic Pressure test (equal to or greater than 50 cm). In some embodiments, the water resistance property of the barrier material qualifies as level 4 based on AATCC 42 Water Resistance-Impact Penetration test (equal to or less than 1.0 grams), AATCC 127 Water Resistance-Hydrostatic Pressure test (equal to or greater than 50 cm). Level 4 also requires compliance with American Society for Testing and Materials ASTM F1671—Resistance to Bacteriophage test (must pass A 4.0 AQL/RQL 20%).

The material of the disposable protective garment may also have anti-bacterial activity. Anti-bacterial activity against Staphylococcus aureus and Klebsiella pneumoniae (bacteria) may be measured by AATCC 147 test. The material of the disposable protective garment may also comply with one or more ASTM tests prescribed by the FDA for barrier performance in non-surgical medical/isolation gowns.

Referring now to FIGS. 1A-1D, the hijab 10 includes a head cover portion 100. In the embodiment shown, the head cover portion 100 covers all of a user's hair and also covers the user's ears. The head cover portion 100 includes a face opening 30. The face opening 30 is designed to have a snug fit around the user's face. The hijab 10 includes an elastic band 31 around the face opening 30.

The hijab 10 further includes a neck cover portion 200 connected to the head cover portion 100. In the embodiment shown, the neck cover portion 200 covers all of the user's neck. The hijab 10 is a slip-on style garment. The neck cover portion 200 is a frustoconical or tubular piece that is wider at its base and narrower where the neck cover portion 200 connects to the head cover portion 100. The neck cover portion 200 may be integral with the head cover portion 100. The neck cover portion 200 may have a wide base 202 to accommodate a user's hair and shoulders.

The hijab 10 may be constructed in any suitable manner from one or more pieces of material. In the embodiment shown, the head cover portion 100 is constructed from a top piece 101 and a side piece 102. The top piece may be tear-drop shaped having an extended tip facing the back of the hijab 10. The top piece 101 and side piece 102 may be connected by a seam 103 or may be adhered together by an adhesive or a weld. The neck cover portion 200 may be integral with the side piece 102.

Any one or more portions of the hijab 10 may include a barrier material 140. The barrier material 140 may include a plurality of layers, such as outer layers 141 and 143 and an inner layer 142 sandwiched between the outer layers 141, 143. The inner layer 142 may be a filter layer.

Figure 2A:
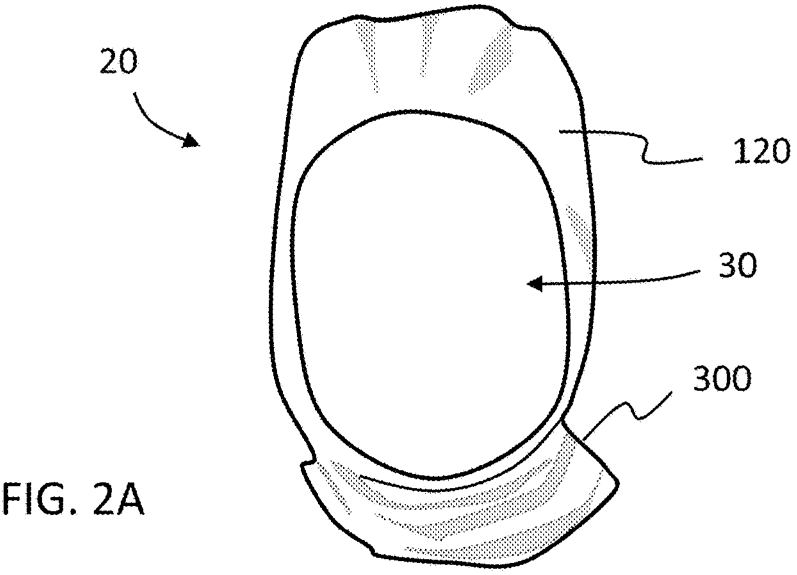
FIG. 2A is a front view of a hijab as worn by a user according to an embodiment.
Figure 2B:
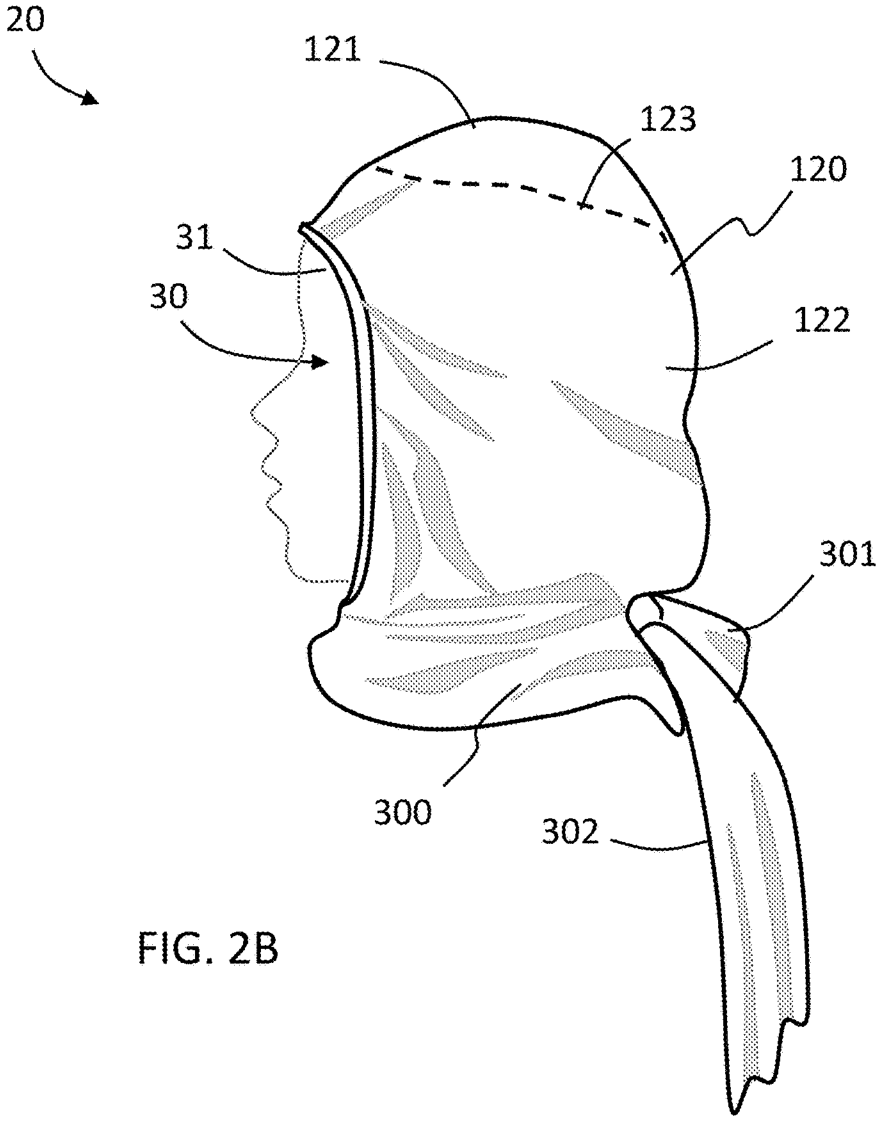
FIG. 2B is a side view of the hijab of FIG. 2A as worn by a user.
Figure 2C:
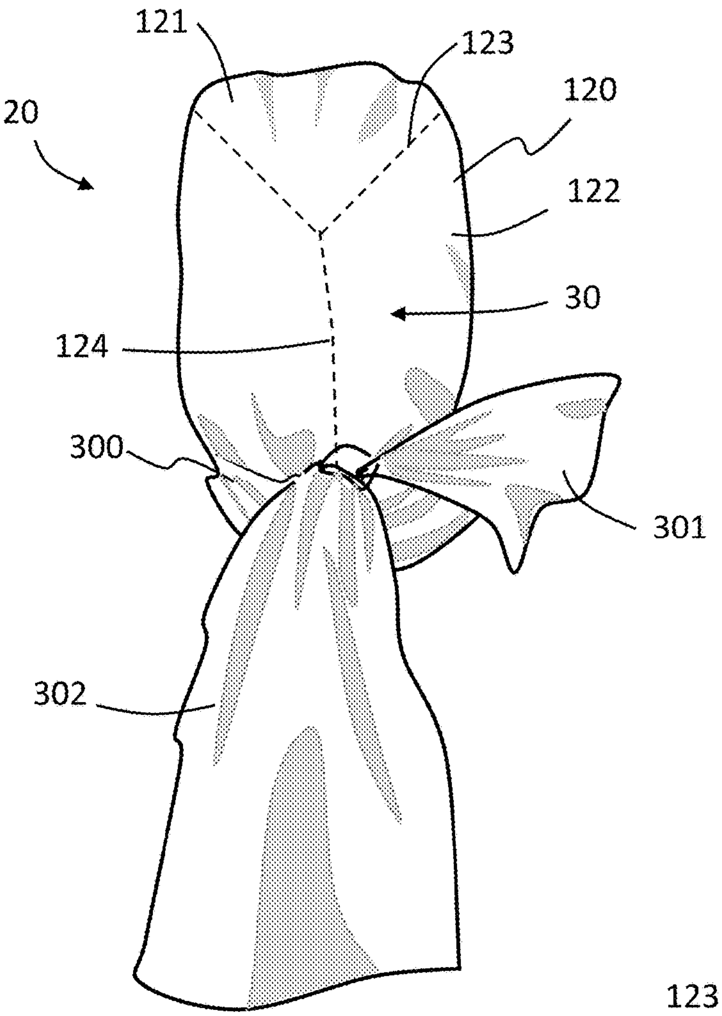
FIG. 2C is a back view of the hijab of FIG. 2A as worn by a user.
Figure 2D:
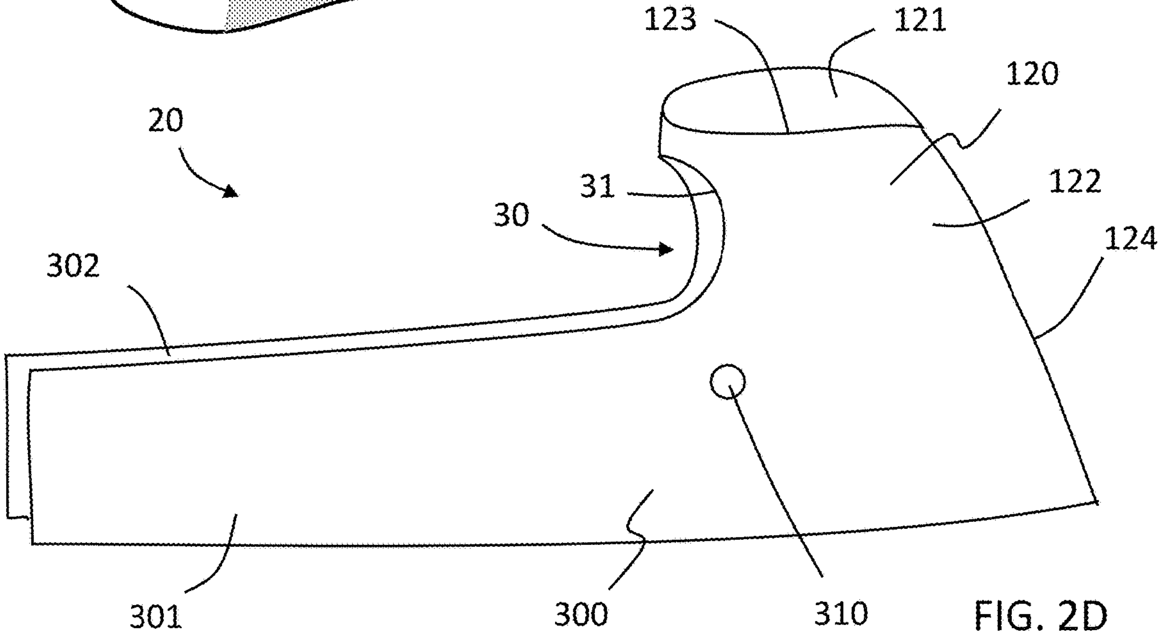
FIG. 2D is a side view of the hijab of FIG. 2A.

In some embodiments, shown in FIGS. 2A-2D, the hijab 20 includes a scarf-like neck cover portion 300. In the embodiment shown, the neck cover portion 300 includes two extensions formed by a first elongated portion 301 and an opposing second elongated portion 302. The first and second elongated portions 301, 302 extend from the head cover portion 120. The first and second elongated portions 301, 302 of the neck cover portion 300 together form a scarf shape to cover the user's neck. The user may wrap the first and second elongated portions 301, 302 around the neck as shown in FIGS. 2A-2C. The first and second elongated portions 301, 302 may be attached or tied in any suitable manner, such as tied in a knot, as shown in FIG. 2C. The neck cover portion 300 may include a hole 310 at the side of the neck cover portion 300. The elongated portion of the opposite side (e.g., the second elongated portion 302 in FIG. 2D) may be threaded through the hole 310.

The hijab 20 is constructed from a top piece 121 and a side piece 122. The top piece 121 may be tear-drop shaped having an extended tip facing the back of the hijab 20. The top piece 121 and side piece 122 may be connected by a seam 123 or may be adhered together by an adhesive or a weld. The back side of the hijab 20 may have a seam 124 running along the center back. The neck cover portion 300 may be integral with the side piece 122.

Figure 3:
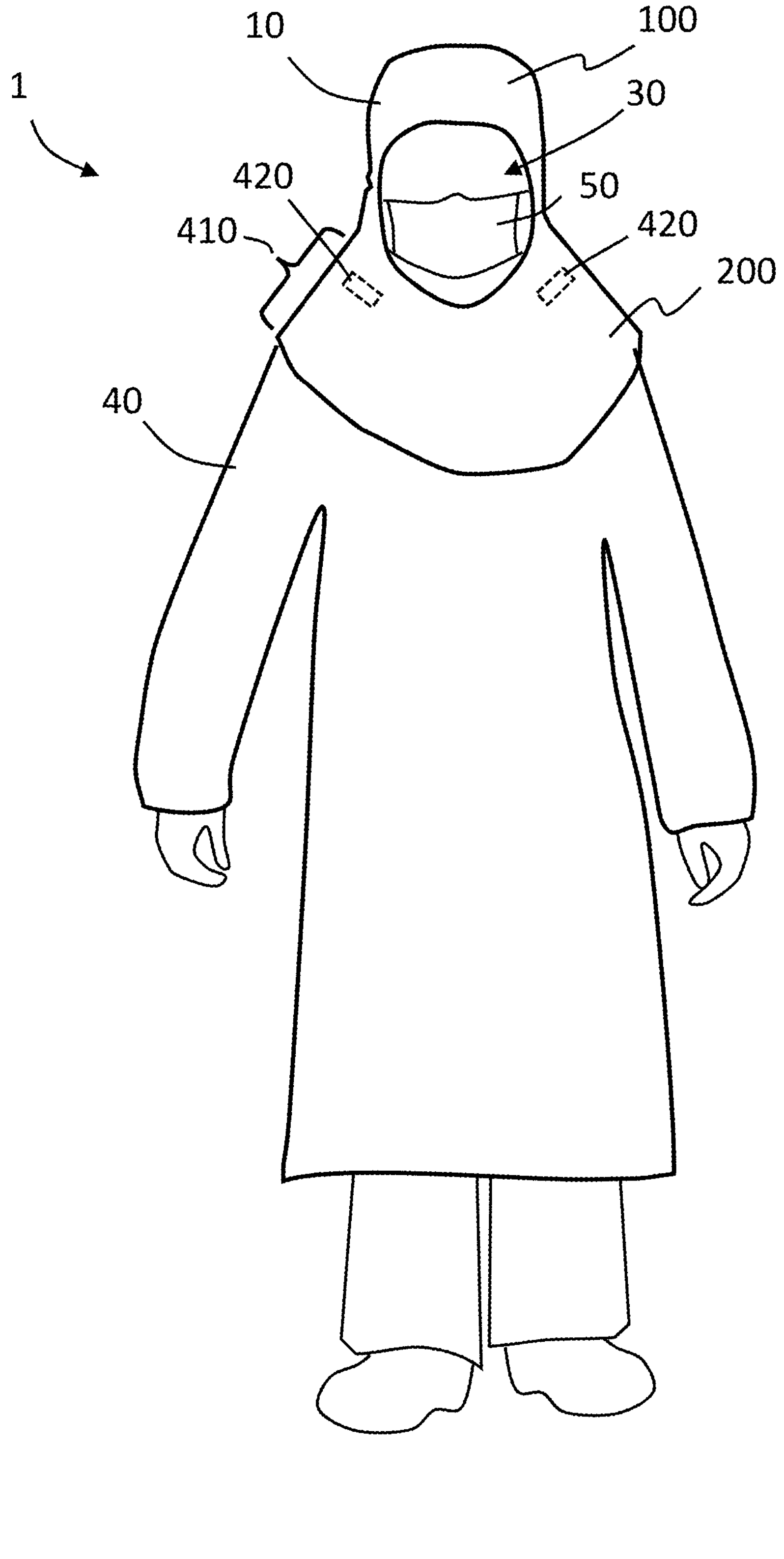
FIG. 3 is a front view of a disposable protective garment including a hijab and a gown according to an embodiment.

In some embodiments, shown in FIG. 3, the hijab 10 is part of a disposable protective garment 1 that also includes a gown 40. The hijab 10 includes a head cover portion 100 and a neck cover portion 200. The gown 40 may extend from the neck cover portion 200. The gown 40 may be removably connected to the hijab 10 via a connecting portion 410. The connecting portion 410 may include a connection mechanism 420. The connection mechanism 420 may be a seam or may include a zipper, buttons, snaps, magnets, hook-and-loop, ties, or the like, or a combination thereof. The disposable protective garment 1 and/or the hijab 10 may optionally include a face covering like face mask 50, as shown in FIG. 3. The face mask 50 may be removably connected to the hijab 10 via a suitable connection mechanism, such as a a zipper, buttons, snaps, magnets, hook-and-loop, ties, or the like.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. It should be understood that this disclosure is not intended to be unduly limited by the illustrative embodiments and examples set forth herein and that such examples and embodiments are presented by way of example only with the scope of the disclosure intended to be limited only by the claims set forth here.

The invention claimed is:

1. A disposable protective garment comprising:
a hijab comprising:
a head cover portion comprising a first piece of a barrier material;
a neck cover portion extending from the head cover portion, the neck cover portion comprising a second piece of the barrier material, the neck cover portion having:
a neck section having a first width;
a first arm extending from the neck section, the first arm having a second width greater than the first width;
an opposing second arm extending from the neck section, the second arm having a third width greater than the first width, wherein the neck section, the first arm, and the second arm are integrally formed, and wherein the neck section, the first arm, and the second arm form a neck opening; and
a hole configured to receive and position one of the first arm and the second arm around a user's neck; and
a face opening,
wherein the neck cover portion has a first end attached to the head cover portion and a second end opposite the first end, the second end being wider than the first end,
wherein the head cover portion and the neck cover portion are constructed of only the first piece of the barrier material and the second piece of the barrier material,
wherein the barrier material comprises:
a first outer layer consisting of an opaque spunbond material;
a second outer layer consisting of the opaque spunbond material;
a meltblown layer; and
a filter layer,
wherein the meltblown layer and the filter layer are disposed between the first outer layer and the second outer layer,
wherein the first piece of the barrier material and the second piece of the barrier material are a top piece and a side piece connected to each other by a seam or adhered by an adhesive or weld,
wherein the top piece is tear drop shaped and has an extended tip facing a back of the hijab,
wherein the seam is configured to be positioned at a center back of the hijab when the hijab is worn by a user,
wherein the neck cover portion is integral with the side piece, the barrier material having a water resistance treatment thereon, the barrier material having a basis weight from 30 gsm to 100 gsm,
wherein the barrier material exhibits a water resistance of level 1 or greater, and
wherein the hijab is suitable for use as a surgical or non-surgical medical garment.

2. The disposable protective garment of claim 1, wherein the face opening comprises an elastic band, and wherein the face opening is at least partially circumscribed by the elastic band.

3. The disposable protective garment of claim 1, wherein the hijab is a single use hijab.

4. The disposable protective garment of claim 1, wherein the hijab is a surgical hijab.

5. The disposable protective garment of claim 1, wherein the hijab is a hijab cover.

6. The disposable protective garment of claim 1, wherein the head cover portion is configured to cover a user's hair and ears and not to substantially cover a user's face.

7. The disposable protective garment of claim 1, wherein the first arm and the second arm of the neck cover portion each comprise a rectangle shape extending from the neck cover portion, the first arm and second arm each being configured to cover the user's neck.

8. The disposable protective garment of claim 1, wherein the barrier material comprises synthetic material selected from polypropylene, polyester, polyamide, polyacrylic, and poly lactic acid; or a semi-synthetic material selected from rayon, modal, lyocell, and viscose; or a combination thereof.

9. The disposable protective garment of claim 1, wherein the barrier material exhibits a water resistance of level 3 or greater.

10. The disposable protective garment of claim 1, wherein the barrier material is breathable.

11. The disposable protective garment of claim 1 further comprising a gown connected to the hijab.

12. The disposable protective garment of claim 11, wherein the gown comprises the barrier material, and wherein the wherein the gown is operably coupled to the hijab by at least one of a zipper, button, snap, magnet, hook-and-loop, and a tie.

13. The disposable protective garment of claim 1, wherein the garment consists of the head cover portion, the neck cover portion, and the face opening, wherein the face opening is at least partially circumscribed by an elastic band.

14. The disposable protective garment of claim 1, wherein the garment is constructed to maintain coverage for modesty.

15. A disposable protective garment comprising:
a hijab comprising:
a head cover portion comprising a first piece of a barrier material;
a neck cover portion extending from the head cover portion, the neck cover portion comprising a second piece of the barrier material including a side portion and opposing rectangular ties extending from the side portion, the rectangular ties being integrally formed with the side portion, the rectangular ties being configured to be wrapped and secured around a user's neck, and a hole disposed through the side portion, wherein the side portion and the rectangular ties form a neck opening; and
a face opening,
wherein the head cover portion and the neck cover portion are constructed of only two pieces of the barrier material, wherein the two pieces of the barrier material are a top piece and a side piece connected to each other by a seam or adhered by an adhesive or weld,
wherein the top piece is tear drop shaped having an extended tip facing a back of the hijab,
wherein the seam is configured to be positioned along a center back of the hijab when the hijab is worn by a user,
wherein the neck cover portion is integral with the side piece,
wherein the barrier material is opaque
wherein the barrier material comprises:
a first outer layer consisting of an opaque spunbond material;
a second outer layer consisting of the opaque spunbond material;
a meltblown layer; and
a filter layer,
wherein the meltblown layer and the filter layer are disposed between the first outer layer and the second outer layer,
wherein the barrier material has a basis weight from 30 gsm to 100 gsm and exhibits a water resistance of level 1 or greater, and
wherein the hijab is suitable for use as a surgical or non-surgical medical garment.

16. The disposable protective garment of claim 15, wherein the garment consists of the head cover portion and the neck cover portion, and wherein the face opening is at least partially circumscribed by an elastic band.

17. A disposable protective garment comprising:
a hijab constructed of a barrier material and comprising:
a head cover portion comprising a first piece of the barrier material;
a neck cover portion extending from the head cover portion, the neck cover portion comprising a second piece of the barrier material and having a neck section, a first arm, an opposing second arm each configured to cover a user's neck and each extending from the neck section, and a hole through the neck cover portion, wherein the hole is configured to receive one of the first arm and the second arm; and
a face opening, and
a gown constructed of the barrier material and connected to the hijab,
wherein the gown is operably coupled to the hijab by at least one of a zipper, button, snap, magnet, hook-and-loop, and a tie,
wherein the head cover portion and the neck cover portion are constructed of only two pieces of the barrier material,
wherein the barrier material comprises:
a first outer layer consisting of an opaque spunbond material;
a second outer layer consisting of the opaque spunbond material;
a meltblown layer; and
a filter layer,
wherein the meltblown layer and the filter layer are disposed between the first outer layer and the second outer layer,
wherein the two pieces of the barrier material are a top piece and a side piece connected to each other by a seam or adhered by an adhesive or weld, wherein the neck cover portion is integral with the side piece, the barrier material having a water resistance treatment thereon,
wherein the top piece is tear drop shaped having an extended tip facing a back of the hijab,
wherein the seam is configured to be positioned along a center back of the hijab when the hijab is worn by a user,
wherein the barrier material has a basis weight from 30 gsm to 100 gsm and exhibits a water resistance of level 1 or greater, and
wherein the disposable protective garment is suitable for use as a surgical or non-surgical medical garment.

* * * * *